United States Patent
Yang et al.

(10) Patent No.: US 7,701,544 B2
(45) Date of Patent: Apr. 20, 2010

(54) LIQUID CRYSTAL DISPLAY DEVICE AND METHOD OF FABRICATING THE SAME

(75) Inventors: Myoung Su Yang, Gyeonggi-do (KR); Dong Su Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 445 days.

(21) Appl. No.: 11/374,003

(22) Filed: Mar. 14, 2006

(65) Prior Publication Data

US 2006/0290873 A1 Dec. 28, 2006

(30) Foreign Application Priority Data

Jun. 28, 2005 (KR) ...................... 10-2005-0056122

(51) Int. Cl.
*G02F 1/1339* (2006.01)
*G02F 1/1333* (2006.01)

(52) U.S. Cl. .................. 349/155; 349/156; 349/157; 349/158

(58) Field of Classification Search .................. 349/42, 349/43, 110, 129, 130, 138, 139, 153, 155–158
See application file for complete search history.

(56) References Cited

U.S. PATENT DOCUMENTS 5,694,185 A * 12/1997 Oh ............................... 349/46
5,815,232 A * 9/1998 Miyazaki et al. ............. 349/155
5,969,784 A * 10/1999 Miyazaki et al. ............. 349/155
6,433,852 B1 * 8/2002 Sonoda et al. ............... 349/156
6,437,847 B1 * 8/2002 Kishimoto ................... 349/155
6,577,374 B1 * 6/2003 Nakata et al. ................ 349/156
7,352,429 B2 * 4/2008 Tseng et al. ................. 349/155
2004/0257519 A1 * 12/2004 Jun et al. ..................... 349/155
2005/0243263 A1 * 11/2005 Yoon ........................... 349/156

* cited by examiner

*Primary Examiner*—Charlie Peng
*Assistant Examiner*—Hung Lam
(74) *Attorney, Agent, or Firm*—Holland & Knight LLP (57) ABSTRACT

A liquid crystal display (LCD) device is disclosed, in which a plurality of spacers are formed around one corresponding projection as the same size and spaced apart from each other, to prevent the deformation of column spacers and to prevent the touch defect, the LCD device including first and second substrates facing each other; gate and data lines crossing each other to define a unit pixel region on the first substrate; a thin film transistor at a crossing area of the gate and data lines; a projection on the predetermined portion of the gate line; a plurality of column spacers overlapped with the predetermined portions of the projection and provided on the second substrate at regular intervals; and a liquid crystal layer between the first and second substrates.

27 Claims, 9 Drawing Sheets

LIQUID CRYSTAL DISPLAY DEVICE AND METHOD OF FABRICATING THE SAME

This application claims the benefit of the Korean Patent Application No. P2005-56122, filed on Jun. 28, 2005, which is hereby incorporated by reference in its entirety.

BACKGROUND OF THE INVENTION

1. Field of the Invention

The present invention relates to a display device, and more particularly, to a liquid crystal display (LCD) device and a method of fabricating the same. Although the present invention is suitable for a wide scope of applications, it is particularly suitable for preventing touch defect.

2. Discussion of the Related Art

Much effort has been made to research and develop various kinds of flat panel display devices as the demands for display device rise due to the ongoing development of the information age. The various kinds of flat panel display devices are LCD (liquid crystal display), PDP (plasma display panel), ELD (electroluminescent display), VFD (vacuum fluorescent display) and the like. Some of these flat panel display devices are already in use in various kinds of instruments.

Among the various flat display devices, the LCD has the advantageous of light weight, thin profile and low power consumption. Thus, the LCD has been replacing the CRT (cathode ray tube) and is a more portable image display device. For example, the LCD is used as a notebook computer monitor for a mobile usage. Further, the LCD can be used in less mobile applications, such as a TV monitor or a computer monitor. In order for the LCD to be a general image display device for various fields, the LCD not only has to maintain the features of the light weight, thin profile and low power consumption but also needs to be capable of implementing high-grade image having high definition and high luminance on a large-sized display panel.

In general, a liquid crystal display device includes a first substrate, a second substrate bonded to the first substrate with a predetermined gap in-between the first and second substrates, and a liquid crystal layer injected between the first and second substrates. A plurality of gate lines crossing a plurality of data lines define pixel areas on the first substrate. A pixel electrode is provided in each of the pixel areas. A thin film transistor is also provide in each of the pixel areas adjacent to where a data line and a gate line of the pixel area cross each other. The thin film transistor of a pixel area provides a data signal from the corresponding data line of the pixel area to the corresponding pixel electrode of the pixel area in response to a signal applied to the corresponding gate line of the pixel area.

A black matrix layer is formed on the second substrate, except for the pixel area, to block light. Red (R), green (G) and blue (B) color filter layers are formed within areas of the black matrix corresponding to each of the pixel areas to display colors. A common electrode is formed on the color filter layers for forming an electric field with the pixel electrodes to implement an image. More particularly, liquid crystal molecules of the liquid crystal layer between the first and second substrates are aligned by an electric field generated between the pixel electrode and the common electrode. By adjusting a quantity of light transmitted through the liquid crystal layer according to the degree of alignment of the liquid crystal layer, an image can be displayed.

The above-configured liquid crystal display device is called a TN (twisted nematic) mode liquid crystal display device. The TN mode liquid crystal display device has the disadvantage of a narrow viewing angle. To overcome this disadvantage of the TN mode liquid crystal display device, an in-plane switching (IPS) mode liquid crystal display device has been developed. In the IPS mode liquid crystal display device, a pixel electrode and a common electrode are formed parallel to each other in a pixel area of a first substrate with a predetermined distance between each other. A transverse electric field is generated between the pixel and common electrodes to align the molecules of a liquid crystal layer.

In both the TN mode and IPS mode, spacers are formed between the first and second substrates of the above-configured liquid crystal display device to sustain a predetermined gap for accommodating the liquid crystal layer. The spacers can be classified as either ball spacers or column spacers, depending on the shape of the spacers. The ball spacers are spherically shaped and are scattered on the first or second substrate. After the first and second substrates have been bonded to each other, the ball spacers are relatively free to move. And, each of the ball spacers has a relatively small contact area with the first or second substrate.

On the other hand, the column spacers are formed during an array fabrication process of either the first or second substrate. Each of the column spacers has a pillar shape having a predetermined height that is affixed to a predetermined substrate. Hence, a contact area of the column spacer with the first or second substrate is relatively greater than the contact area of the ball spacer with the first or second substrate. A related art liquid crystal display device having a column spacer according to a related art is explained with reference to the attached drawings as follows.

Figure 1:
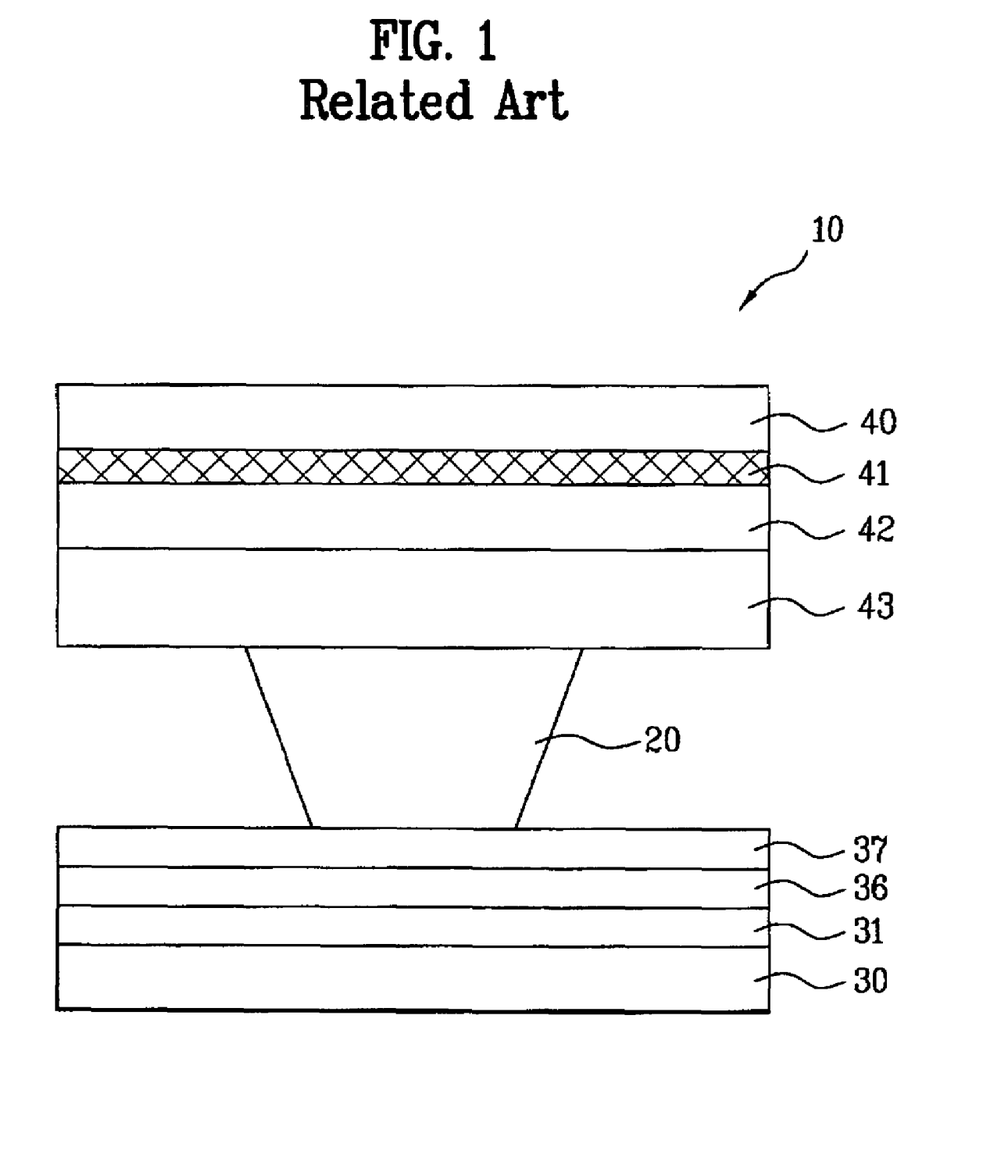
FIG. 1 illustrates a cross-sectional view of an LCD device having column spacers according to the related art.

FIG. 1 is a cross-sectional diagram of the related art liquid crystal display device having a column spacer. Referring to FIG. 1, a liquid crystal display device having a column spacer includes a first substrate 30, a second substrate 40 facing the first substrate 30, a column spacer 20 provided between the first and second substrates 30 and 40, and a liquid crystal layer (not shown in the drawing) provided between the first and second substrates 30 and 40. A gate line 31 and a data line (not shown in the drawing) are arranged to cross each other on the first substrate 30 to define a pixel area. A thin film transistor (TFT) is formed adjacent to the crossing between the gate line 31 and the data line. A pixel electrode (not shown in the drawing) is formed in the pixel area.

Excluding the pixel area, a black matrix layer 41 is formed on the second substrate 40. A stripe type color filter layer 42 is formed on the black matrix layer corresponding to the pixel area on a vertical line parallel to the data line. A common electrode or an overcoat layer 43 is formed over the second substrate 40. A gate insulating layer 36 is formed over the first substrate 30, including the gate line 31, and a passivation layer 37 is formed on the gate insulating layer 36. The column spacer 20 is formed at a predetermined position over the gate line 31.

Figure 2A:
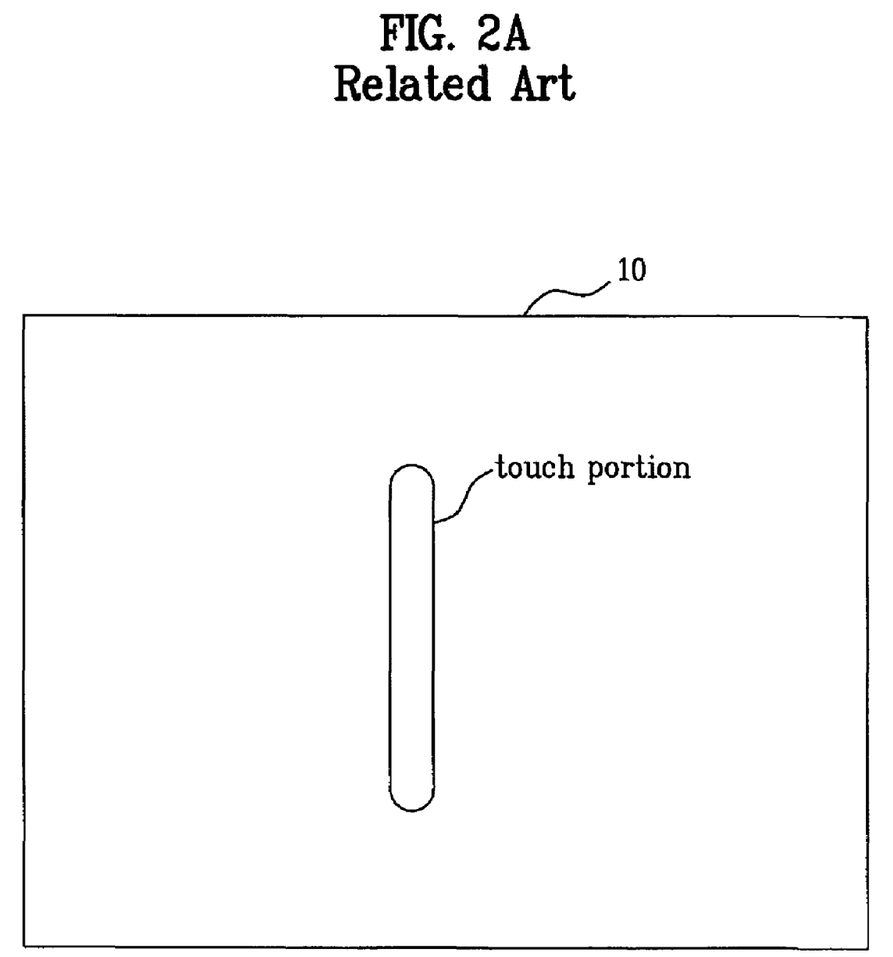
FIGS. 2A and 2B are a plan view and a cross-sectional view of a touch defect generated in a related art LCD device having column spacers, respectively.
Figure 2B:
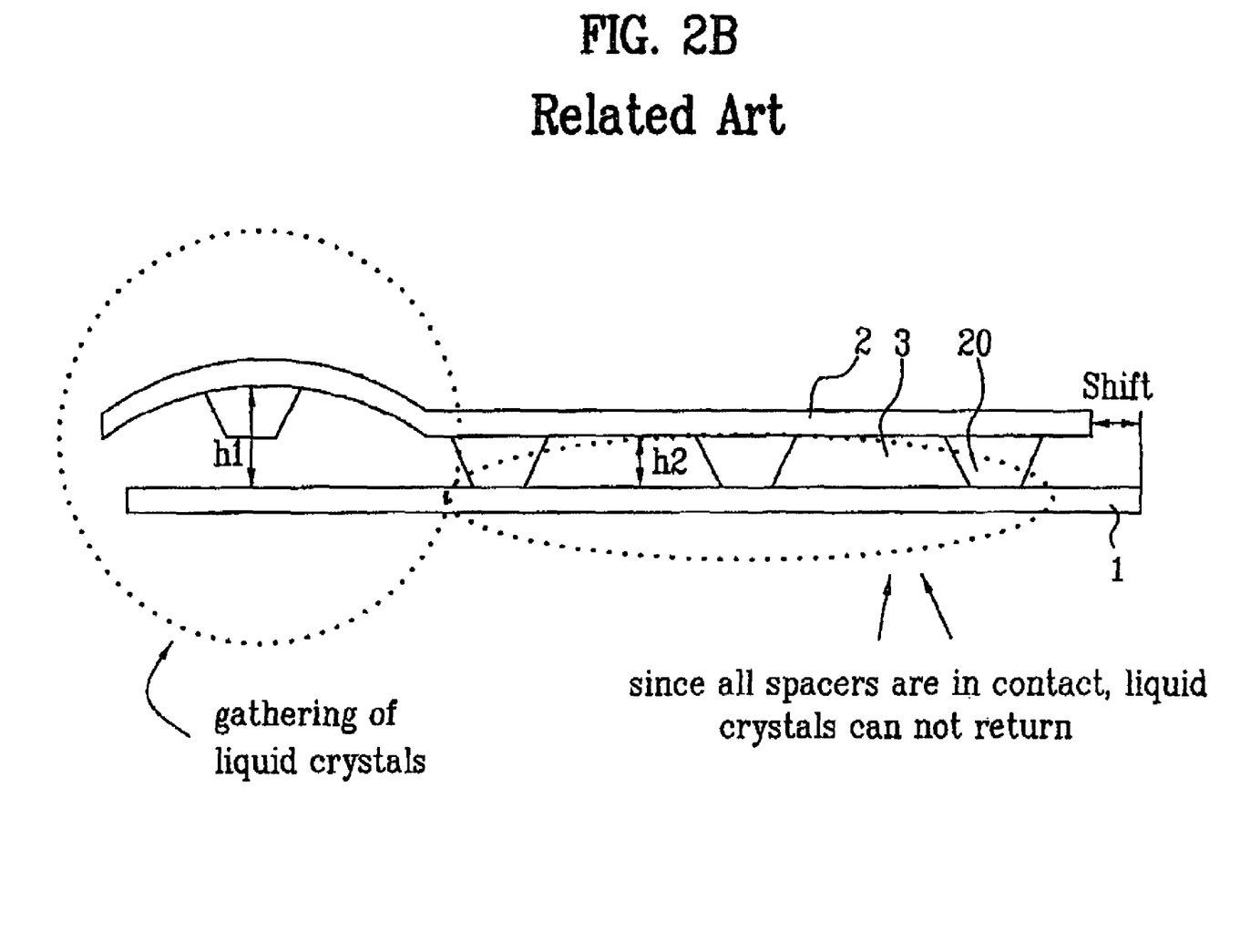

FIGS. 2A and 2B are a plan view and a cross-sectional view of a touch defect generated in a related art LCD device having column spacers, respectively. Referring to FIG. 2A and FIG. 2B, a stain is formed on a part of a liquid crystal panel 10 of the above-explained liquid crystal display device having the column spacer if a surface of the part of the liquid crystal panel 10 is touched by a hand or other external object. This stain is called a touch stain, which is generated on the liquid crystal panel 10 while the panel is being touch. If the stain remains on the panel 10 after being touched, it is called a touch degradation.

A touch stain is caused by a shift between the first and second substrates 1 and 2 due to a touch. The touch degradation is attributed to a large contact area of the column spacer 20 having considerable friction between the column spacer 20 and the first substrate 1, as compared to the friction that would be generated between the ball spacer structure and the first substrate in which the ball spacer structure has less contact area with the first substrate 1. Because of the friction between the column spacer 20 having a column shape and the first substrate 1, as shown in FIG. 2B, it takes a considerably long time for the stained panel to return to an original state after a shift between the first and second substrates 1 and 2 is caused by a touch. Hence, the stain remains until the shift between the first and second substrates 1 and 2 recovers back or is undone.

In addition or in the alternative, the LCD panel can have a gravity degradation. For example, if the LCD panel having a column spacer is held upright and is placed in an environment at a high temperature, the liquid crystals go through thermal expansion such that a cell gap is extended more than the height of the column spacer, which enables liquid crystal molecules to flow downward and make a lower end of the LCD panel bulge, which deteriorates image quality of the LCD panel.

SUMMARY OF THE INVENTION

Accordingly, the present invention is directed to a liquid crystal display (LCD) device and a method of fabricating the same, which substantially obviate one or more problems due to limitations and disadvantages of the related art.

An object of the present invention is to provide a liquid crystal display device configured to prevent touch degradation or touch defect.

Another object of the present invention is to provide a liquid crystal display (LCD) device to prevent the deformation of column spacers and to prevent the touch defect.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes first and second substrates facing each other, gate and data lines crossing each other to define a unit pixel region on the first substrate, a thin film transistor adjacent to a crossing of the gate and data lines, an insulating layer on the gate line, a protrusion over the insulating layer, a plurality of column spacers overlapping portions of the protrusion, and a liquid crystal layer between the first and second substrates.

In another aspect, a liquid crystal display device includes first and second substrates facing each other, gate and data lines crossing each other to define a unit pixel region on the first substrate, a thin film transistor adjacent to a crossing of the gate and data lines, a protrusion over a portion of the gate line, a plurality of column spacers corresponding to the protrusion, and a liquid crystal layer between the first and second substrates.

In another aspect, a method of fabricating a liquid crystal display device having first and second substrates facing each other, includes: forming gate and data lines crossing each other to define a unit pixel region on the first substrate; forming a thin film transistor adjacent to a crossing of the gate and data lines; forming a protrusion over a portion of the gate line; forming a plurality of column spacers corresponding to the protrusion; and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Hereinafter, an LCD device according to the preferred embodiment of the present invention will be described with reference to FIGS. 3 to 10.

Figure 3:
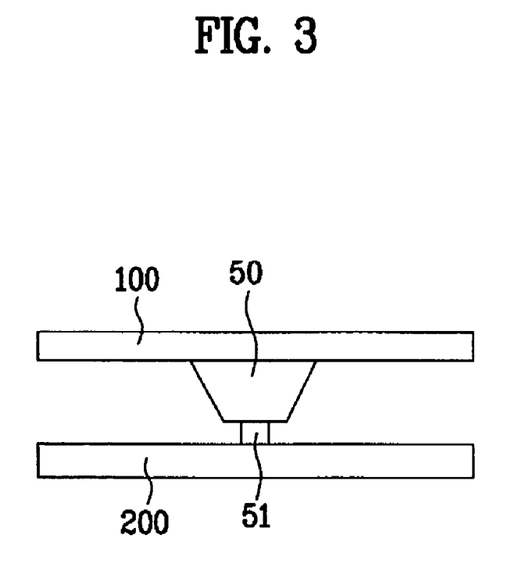
FIG. 3 illustrates a cross-sectional view of a protrusion in an LCD device.
Figure 4:
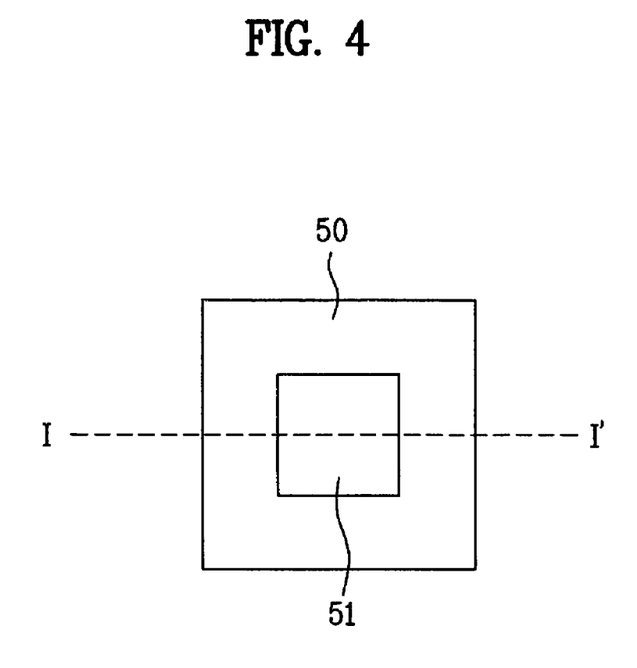
FIG. 4 illustrates a plan view of the protrusion in an LCD device.

FIG. 3 illustrates a cross-sectional view of a protrusion in an LCD device. FIG. 4 illustrates a plan view of a protrusion in an LCD device. As shown in FIG. 3 and FIG. 4, an LCD device having a protrusion includes a first substrate 100 and a second substrate 200 facing each other, a column spacer 50 formed on the first substrate 100, a protrusion 51 formed on the second substrate 200 to oppose the column spacer 50, and a liquid crystal layer (not shown in the drawing) formed between the first and second substrates 100 and 200. The protrusion 51 is configured to correspond with the column spacer 50 and to have a dimensional size smaller than that of the column spacer 50.

When the protrusion 51 having a smaller size is positioned corresponding to an opposing column spacer 50, a contact area between the column spacer 50 and the protrusion 51 is reduced, which decreases frictional area. Because friction between the column spacer 50 and the protrusion 51 is reduced due to the small contact area, when the first and second substrates 100 and 200 are shifted with respect to each other due to a touch, the first and second substrates 100 and 200 can readily return to their original position. Hence, touch degradation and a touch defect can be prevented.

If the protrusion 51 shown in FIGS. 3 and 4 is positioned at the center of the column spacer 50 when an external pressure is applied to the surface of the first or second substrate 100 or 200, the external force is focused at a portion of the top surface of the column spacer 50 corresponding to the protrusion 51. That is, a portion of the top surface of the column spacer 50, which is in contact with the protrusion 51, can be depressed down permanently. Even after the external pressure is removed, the depressed portion of the top surface of the column spacer 50 will not recover to its original state.

Likewise, an external force can be applied to an LCD device with a plurality of column spacers corresponding to a protrusion. The external force causes a plurality of column spacers to permanently conform around the protrusion. The permanent conformations of the column spacers on the first substrate around the protrusion on the second substrate prevent the first and second substrates from shifting relative to one another. Further, the permanent conformations of the column spacers still function to prevent the column spacers from separating from the protrusion when the liquid crystal expands at higher temperature, thereby preventing the gravity defect. Hereinafter, various embodiments of the present invention will be explained as follows.

Figure 5A:
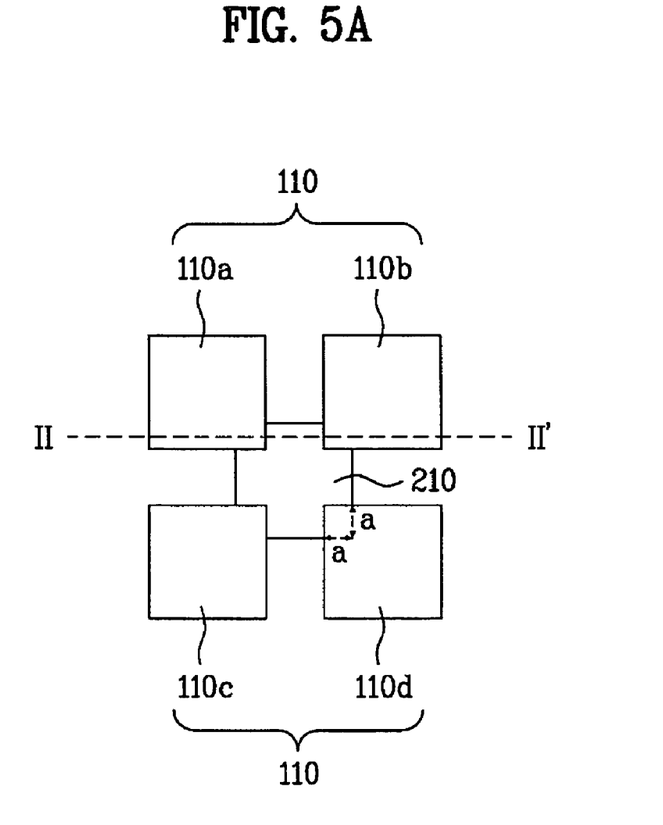
FIG. 5A illustrates a plan view of showing column spacers and a corresponding protrusion in an LCD device according to the first embodiment of the present invention.
Figure 5B:
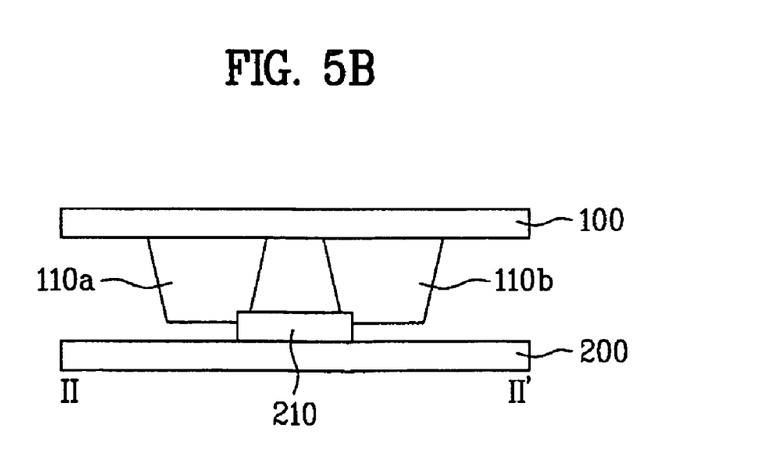
FIG. 5B illustrates a cross-sectional view of showing column spacers and a corresponding protrusion in an LCD device according to the first embodiment of the present invention.

FIG. 5A illustrates a plan view of column spacers and a corresponding protrusion in an LCD device according to the first embodiment of the present invention. FIG. 5B illustrates a cross-sectional view of showing column spacers and a corresponding protrusion in an LCD device according to the first embodiment of the present invention. In the LCD device according to the first embodiment of the present invention, as shown in FIG. 5A and FIG. 5B, four column spacers 110a-110d are provided for one corresponding protrusion 210. Each of the first to fourth column spacers 110a, 110b, 110c and 110d overlaps and conforms to a peripheral edge of a the protrusion 210. In other words, upper surfaces of the first to fourth column spacers 110a, 110b, 110c and 110d overlap predetermined portions of an upper surface of the protrusion 210. In this embodiment, the protrusion 210 has a rectangular shaped upper surface, and each of the first to fourth column spacers 110a, 110b, 110c and 110d have an upper surface that is also a rectangular shape. Also, the first to fourth column spacers 110a, 110b, 110c and 110d are equidistant from each other.

In the LCD device according to the first embodiment of the present invention, as shown in FIGS. 5A and 5B, the first to fourth column spacers 110a, 110b, 110c and 110d are overlapped in correspondence with the four corners of the protrusion 210. In this case, the overlapped areas between each of the first to fourth column spacers 110a, 110b, 110c and 110d and the protrusion 210 are about the same. If an external shifting force is applied to any one of the first and second substrates 100 and 200 by touch, the shift will be resisted by the column spacers 110a, 110b, 110c and 110d at least one of the four corners of the protrusion 210. Because conformations at the edges of the first to fourth column spacers 110a, 110b, 110c and 110d on the protrusion 210 are used, a shift between substrates will not occur, thereby preventing a touch defect.

For example, if an insufficient amount of liquid crystal is applied to the LCD panel of the LCD device according to the related art, the contact area between the opposing substrate and the column spacer increases, thereby increasing the friction. Accordingly, when the substrate is shifted by touch, it is difficult to restore the shifted substrate to the original state. However, in the case of the LCD device according to the present invention, even though the insufficient amount of liquid crystal is applied to the LCD panel, the substrate is not shifted since the plurality of column spacers 110a, 110b, 110c and 110d support the corners of the protrusion 210, thereby preventing the touch defect.

As shown in FIG. 5B, each of the column spacers 110 have a profile in the shape of trapezoid, which includes the longer side in contact with the first substrate 100, and the shorter side as the upper surface opposite to the protrusion 210. The lengths "a" on each side of the protrusion 210 overlapped by the four column spacers 110a-110d is determined based on the desired amount of bonding margin +α. That is, even when there is a misalignment between the first and second substrates 100 and 200, the four column spacers 110a-d partially overlap the corners of the protrusion 210. Overall, the same contact area between the protrusion 210 and the four column spacers 110a-110d is maintained without deviation even when there is a misalignment between first and second substrates 100 and 200. The protrusion 210 and the column spacers 110 can have a variety of shapes, including other polygonal shapes and circular shapes.

Figure 6:
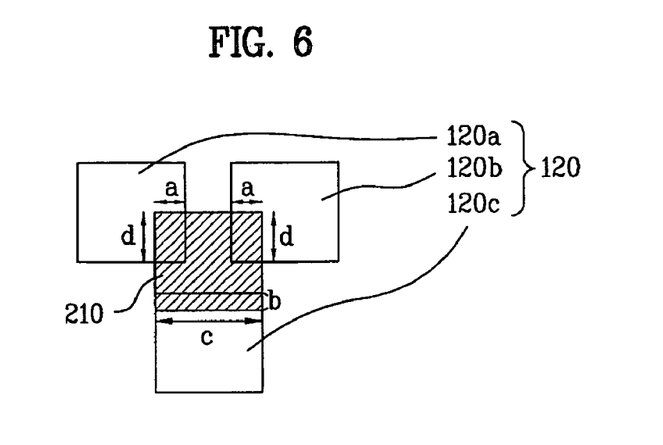
FIG. 6 illustrates a plan view of column spacers and a corresponding protrusion in an LCD device according to the second embodiment of the present invention.

FIG. 6 illustrates a plan view of column spacers and a corresponding protrusion in an LCD device according to the second embodiment of the present invention. In the LCD device according to the second embodiment of the present invention, as shown in FIG. 6, first to third column spacers 120a, 120b and 120c are provided for one corresponding protrusion 210. That is, the first to third column spacers 120a, 120b and 120c overlap three predetermined portions of one protrusion 210. In this embodiment, the protrusion 210 has a rectangular shaped upper surface, and each of the first to third column spacers 120a, 120b and 120c has an upper surface that is also a rectangular shape. Also, the first to third column spacers 120a, 120b, and 120c are equidistant from each other.

The respective overlapped areas between the three column spacers and the three portions of the protrusion 210 are similar in area. The first and second column spacers 120a and 120b are overlapped by two corners of the protrusion 210, and the third column spacer 120c is overlapped by one side edge of the protrusion 210. Herein, the dimensions "a" and "d" of the overlapped area between the first column spacer 120a and one corner of the protrusion 210 are the same in as the dimensions "a" and "d" of the overlapped area between the second column spacer 120b and another corner of the protrusion 210. Also, the overlapped area having the dimensions "b" and "c" between the third column spacer 120c and the protrusion 210 is the same as the overlapped area between the protrusion 210 and one of the column spacers 120a and 120b. In the LCD device according to the second embodiment of the present invention, because the column spacers 120 conform to one corresponding protrusion 210 as depressions in the first to third column spacers 120a, 120b, and 120c, a shift between substrates is prevented, thereby preventing touch degradation.

Figure 7:
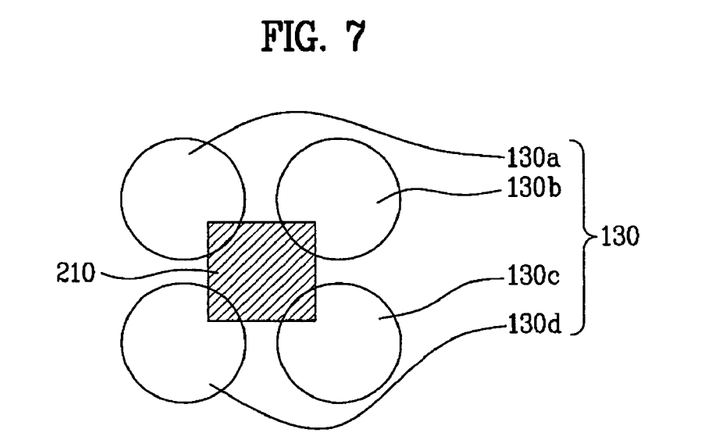
FIG. 7 illustrates a plan view of column spacers and a corresponding protrusion in an LCD device according to the third embodiment of the present invention.

FIG. 7 illustrates a plan view of column spacers and a corresponding protrusion in an LCD device according to the third embodiment of the present invention. As shown in FIG. 7, four column spacers 130a-130d are provided for one corresponding protrusion 210. Each of the first to fourth column spacers 130a, 130b, 130c and 130d overlaps a corner of the protrusion 210. In other words, upper surfaces of the first to fourth column spacers 130a, 130b, 130c and 130d overlap predetermined portions of an upper surface of the protrusion 210. In this embodiment, the protrusion 210 has a rectangular shaped upper surface, and each of the first to fourth column spacers 130a, 130b, 130c and 130d has an upper surface that has a circular shape. Also, the first to fourth column spacers 130a, 130b, 130c and 130d are equidistant from each other.

In the LCD device according to the third embodiment of the present invention, as shown in FIG. 7, the first to fourth column spacers 130a, 130b, 130c and 130d are overlapped in correspondence with the four corners of the protrusion 210. In this case, the overlapped area between each of the first to fourth column spacers 130a, 130b, 130c and 130d and the protrusion 210 is the same. If an external shifting force is applied to any one of the first and second substrates 100 and 200 by touch, the column spacers 130a, 130b, 130c and 130d can resist the shifting force at least at one of the four corners of the protrusion 210. Because conformations at the edges of the first to fourth column spacers 130a, 130b, 130c and 130d on the protrusion 210 are used, a shift between substrates will not occur, thereby preventing a touch defect.

Figure 8:
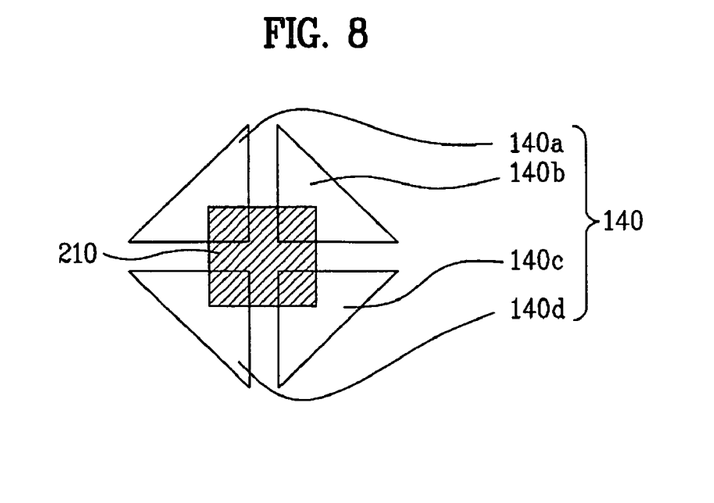
FIG. 8 illustrates a plan view of column spacers and a corresponding protrusion in an LCD device according to the fourth embodiment of the present invention.

FIG. 8 illustrates a plan view showing column spacers and a corresponding protrusion in an LCD device according to the fourth embodiment of the present invention. As shown in FIG. 8, four column spacers 140a-140d are provided for one corresponding protrusion 210. Each of the first to fourth column spacers 140a, 140b, 140c and 140d overlaps and conforms to a corner of the protrusion 210. In other words, upper surfaces of the first to fourth column spacers 140a, 140b, 140c and 140d overlap predetermined portions of an upper surface of the protrusion 210. In this embodiment, the protrusion 210 has a rectangular shaped upper surface, and each of the first to fourth column spacers 140a, 140b, 140c and 140d have an upper surface that has a triangular shape. Also, the first to fourth column spacers 140a, 140b, 140c and 140d are equidistant from each other.

In the LCD device according to the fourth embodiment of the present invention, as shown in FIG. 8, the first to fourth column spacers 140a, 140b, 140c and 140d are overlapped and conformed to the four corners of the protrusion 210. In this case, the overlapped area between each of the first to fourth column spacers 140a, 140b, 140c and 140d and the protrusion 210 is the same. If an external shifting force is applied to any one of the first and second substrates 100 and 200 by touch, the shift will be resisted by the column spacers 140a, 140b, 140c and 140d at the four corners of the protrusion 210. Because conformations at the edges of the first to fourth column spacers 140a, 140b, 140c and 140d on the protrusion 210 are used, a shift between substrates will not occur, thereby preventing a touch defect.

Figure 9:
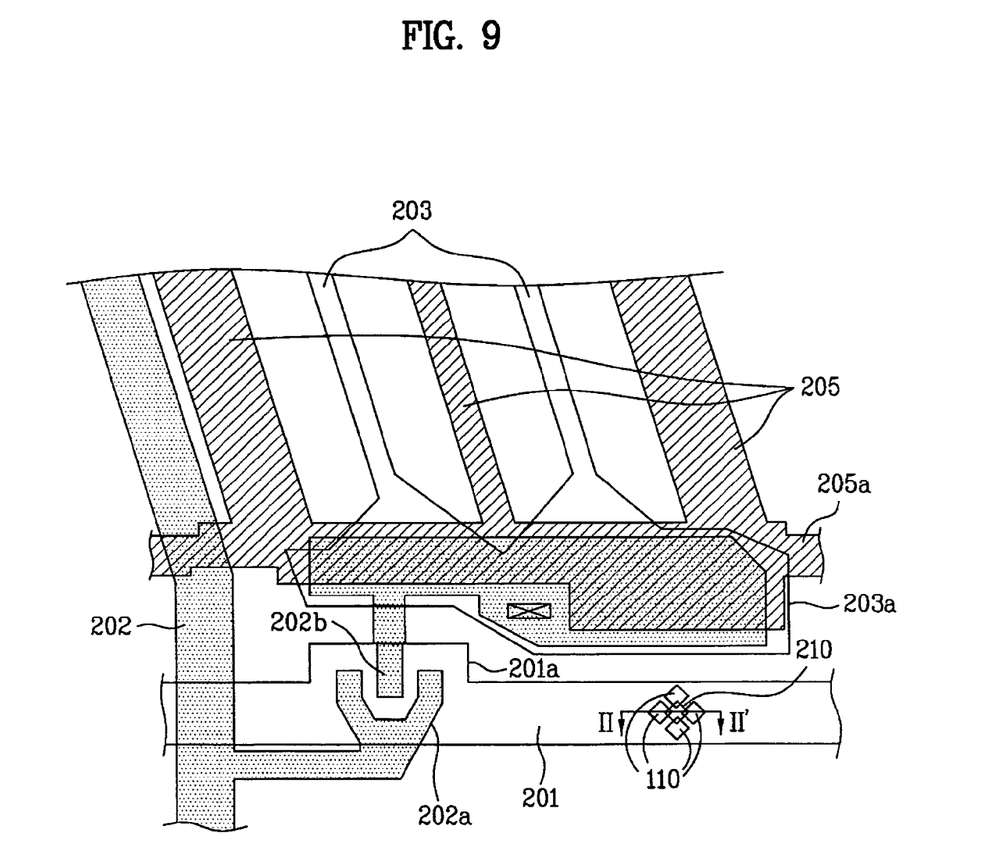
FIG. 9 illustrates a plan view of an LCD device according to an embodiment of the present invention.
Figure 10:
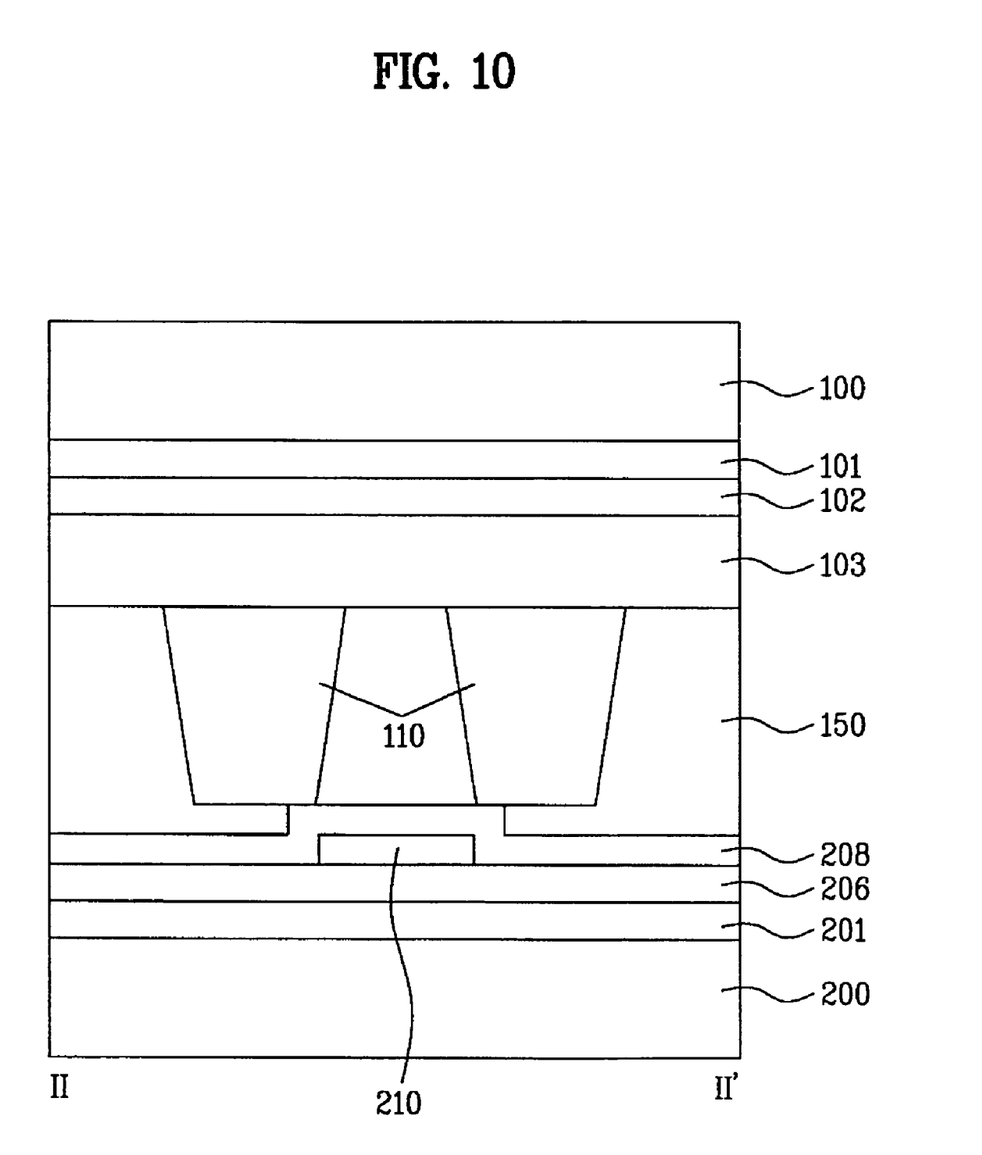
FIG. 10 illustrates a cross-sectional view along II-II' of FIG. 9.

FIG. 9 illustrates a plan view of an LCD device according to an embodiment of the present invention. FIG. 10 illustrates a cross-sectional view along II-II' of FIG. 9. As shown in FIG. 9 and FIG. 10, the LCD device according to an embodiment of the present invention includes first and second substrates 100 and 200 facing each other, a protrusion 210, a plurality of column spacers 110, and liquid crystal 150. The protrusion 210 is formed on the predetermined portion of the second substrate 200. The plurality of column spacers 110 are provided for one corresponding protrusion 210. Further, the plurality of column spacers 110 are overlapped with and conformed to predetermined portions of one protrusion 210.

A gate line 201 having a gate electrode 201a is formed in a first direction on the second substrate 200, as shown in FIGS. 9 and 10. Also, a gate insulating layer 206 is formed over an entire surface of the second substrate 200, including the gate line 201. An island-shaped semiconductor layer (not shown) is formed over the gate insulating layer above the gate electrode 201 a. Then, a data line having a source electrode 202a is formed in a second direction perpendicular to the gate line 201 on the second substrate 200. After that, a passivation layer 208 is formed over the entire surface of the second substrate 200, including the data line 202. Then, a pixel electrode 203 and a common electrode 205 are alternately formed in a pixel region above the passivation layer 208. The common electrode 205 is positioned adjacent to the gate line 201 such that the common electrode 205 is extended from a common line 205a parallel to the gate line 201.

A TFT includes the gate electrode 201a protruding from the gate line 201, the U-shaped source electrode 202a protruding from the data line 202, a drain electrode 202b partially positioned in the U-shaped pattern, and the semiconductor layer overlapping with the source and drain electrodes 202a and 202b above the gate electrode 201a. The semiconductor layer is formed of a stacked structure including an amorphous silicon layer and an impurity layer. Also, the impurity layer is removed from the portion of the amorphous silicon layer between the source electrode 202a and the drain electrode 202b. The source electrode 202a may have U-shaped electrode as explained above, or just a straight bar shape. If the source electrode 202a is U-shaped, it is possible to increase the channel area so as to improve the efficiency of thin film transistor TFT.

The LCD device according to embodiments of the present invention has the protrusion 210 that is positioned at a predetermined portion over the gate line 201. The protrusion 210 may be formed of a single structure of a semiconductor layer pattern or a source/drain electrode layer, or may be formed as a stacked structure of the semiconductor layer pattern and the source/drain electrode layer. The semiconductor layer pattern is formed during patterning of the semiconductor layer for the thin film transistor, and the semiconductor layer pattern is formed of the same material as the semiconductor layer (amorphous silicon layer and impurity layer). The source/drain electrode layer for the protrusion 210 is formed in the process of patterning the data line and source and drain electrodes, and the source/drain electrode layer for the protrusion 210 is formed of the same metal material as the data line and the source and drain electrodes. Also, since the protrusion 210 is formed of the semiconductor layer pattern or the source/drain electrode layer, the protrusion 210 is formed above the gate insulating layer 206 and below the passivation layer 208.

A storage electrode 203a is formed as one body along with the pixel electrode. The storage electrode 203a overlaps the common line 205a and forms a storage capacitor along with the gate insulating layer 206 and the passivation layer 208, which are interposed between the storage electrode 203a and the common line 205a.

The first substrate 100 includes a black matrix layer 101 corresponding to the gate and data lines that blocks light except in the pixel regions. The first substrate 100 also includes a color filter layer 102 corresponding to the pixel regions, and an overcoat layer 103. The color filter layer is formed on the second substrate 100 including the black matrix layer 101, and the overcoat layer 103 is formed over the entire surface of the second substrate 100, including the black matrix layer 101 and the color filter layer 102. Also, the column spacers 110 are formed on the overcoat layer corresponding to the protrusion 210 of the gate line 201.

Figure 11:
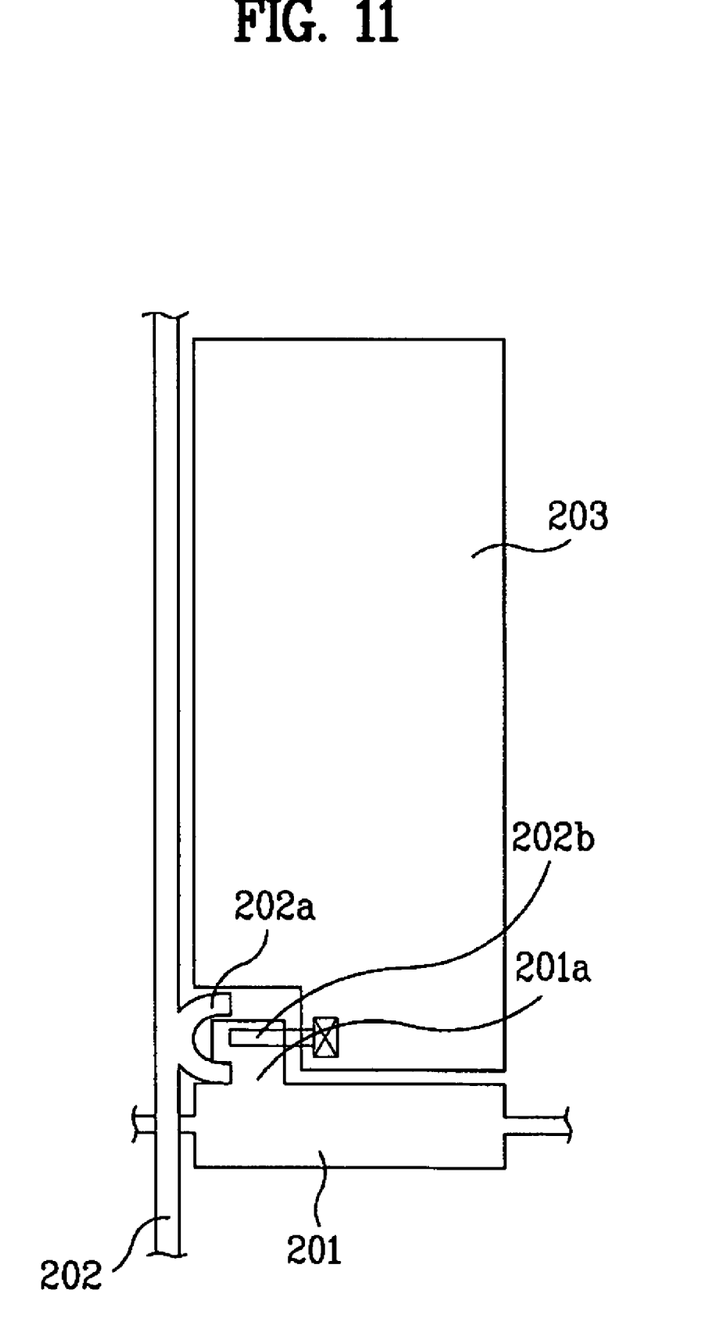
FIG. 11 illustrates a plan view of a TN-mode LCD device according to an embodiment of the present invention.

The aforementioned LCD device is applied to an IPS (In-Plane Switching) mode LCD device. However, the structure of providing the plurality of column spacers to one protrusion is also applicable to a TN (Twisted Nematic) mode. FIG. 11 illustrates a plan view of a TN-mode LCD device according to an embodiment of the present invention. As shown in FIG. 11, in the case of the TN-mode LCD device according an embodiment of the present invention, only pixel electrode 203 is formed in a pixel region instead of forming alternating pixel and common electrodes.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
    first and second substrates facing each other;
    gate and data lines crossing each other to define a unit pixel region on the first substrate;
    a thin film transistor adjacent to a crossing of the gate and data lines;
    an insulating layer on the gate line;
    a protrusion over the insulating layer on the first substrate;
    a plurality of column spacers on the second substrate surrounding peripheral corners of the protrusion, wherein each column spacer are partially overlapping the protrusion with same area as each other, the column spacers are equidistant from a center of the protrusion and the column spacers symmetrically conform to the corner of the protrusion; and
    a liquid crystal layer between the first and second substrates.

2. The LCD device of claim 1, wherein each of the plurality of column spacers has a top surface with a polygonal shape.

3. The LCD device of claim 1, wherein each of the plurality of column spacers has a top surface with a circular shape.

4. The LCD device of claim 1, wherein the protrusion has a top surface with a polygonal shape.

5. The LCD device of claim 1, wherein the protrusion has a top surface with a circular shape.

6. The LCD device of claim 1, wherein the thin film transistor includes:
    a gate electrode protruding from the gate line;
    a source electrode protruding from the data line;
    a drain electrode formed in the same layer as the source electrode at an interval from the source electrode; and
    a semiconductor layer partially overlapping the source and drain electrodes above the gate electrode.

7. The LCD device of claim 6, wherein the protrusion is formed of the same layer as the semiconductor layer.

8. The LCD device of claim 6, wherein the protrusion is formed of the same layer as the source and drain electrodes.

9. The LCD device of claim 6, wherein the protrusion is a stacked structure including a semiconductor layer pattern formed of the same layer as the semiconductor layer, and a source/drain electrode layer formed of the same layer as the source and drain electrodes.

10. A liquid crystal display device comprising:
    first and second substrates facing each other;
    gate and data lines crossing each other to define a unit pixel region on the first substrate;
    a thin film transistor adjacent to a crossing of the gate and data lines;
    a protrusion over a portion of the gate line on the first substrate;
    a plurality of column spacers on the second substrate surrounding peripheral corners of one protrusion, wherein each column spacer is partially overlapping the one protrusion with same area as each other, and the column spacers are equidistant from a center of the one protrusion and the column spacers symmetrically conform to the corner of the protrusion; and
    a liquid crystal layer between the first and second substrates.

11. The LCD device of claim 10, wherein each of the plurality of column spacers has a top surface with a polygonal shape.

12. The LCD device of claim 10, wherein each of the plurality of column spacers has a top surface with a circular shape.

13. The LCD device of claim 10, wherein the protrusion has a top surface with a polygonal shape.

14. The LCD device of claim 10, wherein the protrusion has a top surface with a circular shape.

15. The LCD device of claim 10, wherein the thin film transistor includes:
    a gate electrode protruding from the gate line;
    a source electrode protruding from the data line;
    a drain electrode formed in the same layer as the source electrode at an interval from the source electrode; and
    a semiconductor layer partially overlapping the source and drain electrodes above the gate electrode.

16. The LCD device of claim 15, wherein the protrusion is formed of the same layer as the semiconductor layer.

17. The LCD device of claim 15, wherein the protrusion is formed of the same layer as the source and drain electrodes.

18. The LCD device of claim 15, wherein the protrusion is a stacked structure including a semiconductor layer pattern formed of the same layer as the semiconductor layer, and a source/drain electrode layer formed of the same layer as the source and drain electrodes.

19. A method of fabricating a liquid crystal display device having first and second substrates facing each other, comprising:
    forming gate and data lines crossing each other to define a unit pixel region on the first substrate;
    forming a thin film transistor adjacent to a crossing of the gate and data lines;
    forming a protrusion over a portion of the gate line on the first substrate;
    forming a plurality of column spacers on the second substrate surrounding peripheral corners of one protrusion, wherein each column spacer is partially overlapping the one protrusion with same area as each other, and the column spacers are equidistant from a center of the one protrusion and the column spacers symmetrically conform to the corner of the protrusion; and
    forming a liquid crystal layer between the first and second substrates.

20. The method of claim 19, wherein each of the plurality of column spacers has a top surface with a polygonal shape.

21. The method of claim 19, wherein each of the plurality of column spacers has a top surface with a circular shape.

22. The method of claim 19, wherein the forming the thin film transistor includes:
    forming a gate electrode protruding from the gate line;
    forming a source electrode protruding from the data line;

forming a drain electrode in the same layer as the source electrode at an interval from the source electrode; and forming a semiconductor layer partially overlapping the source and drain electrodes above the gate electrode.

23. The method of claim 19, wherein the protrusion is formed of the same layer as the semiconductor layer.

24. The method of claim 19, wherein the protrusion is formed of the same layer as the source and drain electrodes.

25. The method of claim 19, wherein the protrusion is a stacked structure including a semiconductor layer pattern formed of the same layer as the semiconductor layer, and a source/drain electrode layer formed of the same layer as the source and drain electrodes.

26. The method of claim 19, wherein the protrusion has a top surface with a polygonal shape.

27. The method of claim 19, wherein the protrusion has a top surface with a circular shape.

* * * * *